United States Patent
Bharadwaj et al.

(10) Patent No.: US 9,454,213 B2
(45) Date of Patent: Sep. 27, 2016

(54) METHOD, APPARATUS, SYSTEM FOR LANE STAGGERING AND DETERMINISM FOR SERIAL HIGH SPEED I/O LANES

(71) Applicant: Intel Corporation, Santa Clara, CA (US)

(72) Inventors: Prahladachar Jayaprakash Bharadwaj, Bangalore (IN); Debendra Das Sharma, Saratoga, CA (US); Harshit Poladia, San Jose, CA (US); Kanaka Lakshmi Gadey Naga Venkata, Fremont, CA (US)

(73) Assignee: Intel Corporation, Santa Clara, CA (US)

(*) Notice: Subject to any disclaimer, the term of this patent is extended or adjusted under 35 U.S.C. 154(b) by 279 days.

(21) Appl. No.: 14/141,184

(22) Filed: Dec. 26, 2013

(65) Prior Publication Data
US 2015/0185809 A1 Jul. 2, 2015

(51) Int. Cl.
*G06F 1/32* (2006.01)
*G06F 13/40* (2006.01)

(52) U.S. Cl.
CPC ......... *G06F 1/3253* (2013.01); *G06F 13/4027* (2013.01)

(58) Field of Classification Search
CPC .................. G06F 1/3253; G06F 13/4027
See application file for complete search history.

(56) References Cited

U.S. PATENT DOCUMENTS

| | | | | |
|---|---|---|---|---|
| 6,690,757 | B1* | 2/2004 | Bunton | H04L 25/14 370/427 |
| 7,188,263 | B1* | 3/2007 | Rubinstein | G06F 1/3209 713/300 |
| 7,330,051 | B1* | 2/2008 | Huang | H03K 19/17744 326/38 |
| 2009/0248945 | A1* | 10/2009 | Navaratnam | H04L 25/0272 710/316 |
| 2009/0259787 | A1* | 10/2009 | Elgousi | G06F 13/4022 710/118 |

* cited by examiner

*Primary Examiner* — Kim Huynh
*Assistant Examiner* — Siamak S Hefazi
(74) *Attorney, Agent, or Firm* — International IP Law Group, P.L.L.C.

(57) ABSTRACT

A method of staggering lanes in a peripheral component interconnect express (PCI-Express) port is described herein. The method includes initiating the port to enter or exit an electrical idle state. The method also includes forwarding a token to a predetermined lane of the port. Additionally, the method includes turning the predetermined lane ON or OFF by indication to an analog circuit interface. The method also includes forwarding the token to a neighboring lane when a staggering interval timer elapses.

17 Claims, 12 Drawing Sheets

200

400

600

700

800A

800B

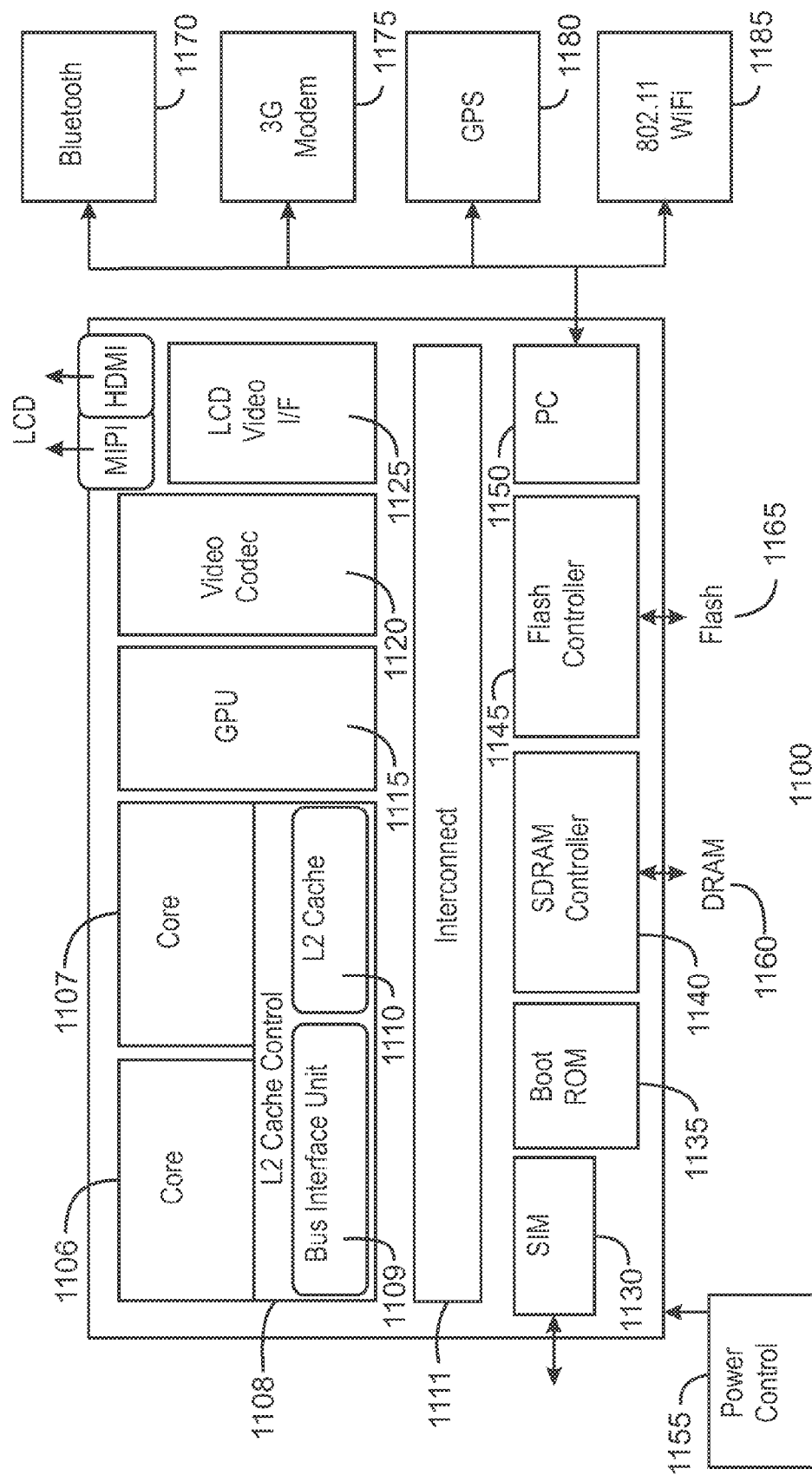

METHOD, APPARATUS, SYSTEM FOR LANE STAGGERING AND DETERMINISM FOR SERIAL HIGH SPEED I/O LANES

TECHNICAL FIELD

This disclosure pertains to lane staggering and determinism for serial high speed I/O lane architectures.

BACKGROUND ART

Some examples of architectures with serial high speed I/O lanes include the serial advanced technology attachment (SATA), universal serial bus (USB), and peripheral component interconnect express (PCI-Express or PCIe), among others. The PCI-Express interconnect architecture enables components and devices from different vendors to interoperate in an open architecture. This architecture spans multiple market segments, from clients to servers. The PCIe uses numerous lanes for communication between components, and operates according to a PCIe specification. The PCI-Express Specification states that the Electrical Idle differential peak output voltage per lane (VTX-IDLE-DIFF-AC-p) is not to exceed 20 mv (p-p). However, if all the lanes of a specific configuration enter or exit an idle state simultaneously, the differential peak can be large, exceeding this limit. As PCIe compliant computing systems continue to increase the number of communication lanes, the problem becomes more challenging. As the PCIe lanes shrink to 22 nm and below, the differential peak can exceed 20 mV if all the lanes enter or exit an idle state simultaneously, which may damage the end card circuits. This phenomenon is observed from actual simulations. Approaches for maintaining the differential peak within the specification, such as adding large capacitors on board lanes to absorb the differential current, are not sufficient for interconnects with larger numbers of lanes, and where the technology has shrunk to 22 nm and below.

Further, as more functionality, like PCIe, gets integrated into processors, it becomes increasingly difficult to replicate errors found in the post debug cycle. Periodic System Management Interrupt (PSMI) technology is some help with this issue. However, PSMI works with deterministic protocols, and PCI-Express is not deterministic. Rather, PCI-Express includes non-deterministic elements such as flow control, Low-Power states, and speed change built into the specification.

BRIEF DESCRIPTION OF THE DRAWINGS

FIG. 11 is an embodiment of a system on-chip (SOC) design, in accordance with embodiments.

DESCRIPTION OF THE EMBODIMENTS

Figure 1:
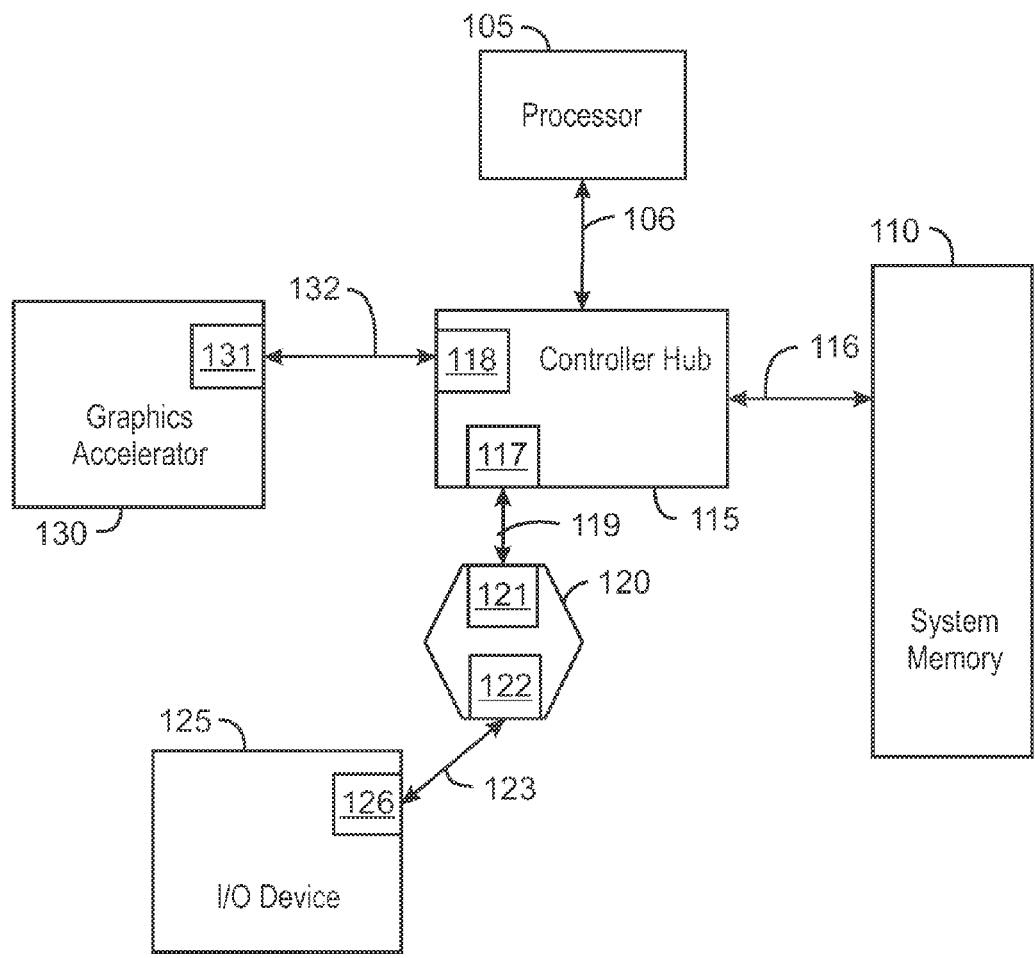
FIG. 1 is a block diagram of a computing system including a peripheral component interconnect express (PCI-Express or PCIe), in accordance with embodiments.

In the following description, numerous specific details are set forth, such as examples of specific types of processors and system configurations, specific hardware structures, specific architectural and micro architectural details, specific register configurations, specific instruction types, specific system components, specific measurements or heights, specific processor pipeline stages and operation, etc., in order to provide an understanding of the present techniques. It will be apparent, however, to one skilled in the art that these specific details need not be employed to practice the present techniques. In other instances, well known components or methods, such as specific and alternative processor architectures, specific logic circuits or code for described algorithms, specific firmware code, specific interconnect operation, specific logic configurations, specific manufacturing techniques and materials, specific compiler implementations, specific expression of algorithms in code, specific power down and gating techniques, or logic, and other specific operational details of a computer system have not been described in detail in order to avoid obscuring the present techniques.

As computing systems are advancing, the components therein are becoming more complex. As a result, the interconnect architecture to couple and communicate between the components is also increasing in complexity to ensure bandwidth requirements are met for component operation. Further, different market segments expect interconnect architectures to suit their different individual needs. For example, the segment for servers requests higher performance, while mobile ecosystem clients may sacrifice overall performance for power savings. Yet, most fabrics attempt to prioritize both performance and power savings for their customers. Below, a number of interconnects are discussed, which would potentially benefit from aspects of the techniques described herein.

In embodiments of the present techniques, all the lanes of high speed serial input/output (I/O) ports are turned on and off in a staggered fashion such that the differential peak is within the specified range. In one embodiment, staggering is enabled on the Receive and Transmit lanes. A lane stagger arbiter (LSA), described with reference to FIG. 3 below, provides the ability to stagger the adjacent port regardless of the port configuration (e.g., widths) while staggering the lanes within ports. The ability to stagger multiple physical ports can also be programmed.

Additionally, embodiments of the present techniques support determinism for the high speed serial I/O lanes by eliminating the use of circuits that cause the divergence from determinism. In such embodiments, there is no support for the lower power states to eliminate the non-deterministic nature of the analog squelch circuitry.

A squelch occurs when data is not being transmitted, i.e., there is not any voltage on the lanes. The squelch circuitry detects whether the lanes are in electrical idle, i.e., the squelch. Squelches can happen because lower power states are used to conserve power. When conserving power, data is not being transmitted.

On the squelch circuit wire, the transmitters are sending a serial bit stream, e.g., 1, 0, 1, 0 when actively transmitting the data. Upon entering the lower power state, the transmitter is shut off. The lanes go into electrical idle state, meaning that the lanes have a specific common mode voltage around 0.2 or 0.3 mV. This state is detected by the squelch circuitry, meaning that a squelch has been detected on the wires, a squelch in electrical items. There is no activity on the wire. The squelch, in literal terms, means no activity on the wire. Once the other end starts transmitting, the squelch circuit detects activity on the wire, and the squelch is broken, meaning that the lane is no longer idle. Rather, an interconnected component is sending data.

The low power states make the analog squelch circuitry non-deterministic. In order to eliminate the use of circuits that cause the divergence from determinism, embodiments provide no support for the lower power states. Eliminating the low power states eliminates the non-deterministic nature of the analog squelch circuitry.

Additionally, in order to eliminate the speed change involved in coming up to Gen2 or Gen3 speeds, embodiments of the present techniques include a proprietary mechanism to start a processor directly at Gen2 or Gen3 speeds to support the high volume manufacturing (HVM) debug at those speeds (at-speed), thus increasing the test coverage.

As mentioned above, a lane stagger arbiter ensures that multiple lanes do not switch simultaneously due to power state transitions. Simultaneous transitions between multiple lanes may cause the voltage supply to fluctuate, as demonstrated through the circuit simulations results for an example case shown in Table 1:

FIG. 1 is a block diagram of a computing system 100 including a peripheral component interconnect express (PCI-Express or PCIe), in accordance with embodiments. The PCIe is an example interconnect fabric architecture. The PCIe enables components and devices from different vendors to inter-operate in an open architecture, spanning multiple market segments; Clients (Desktops and Mobile), Servers (Standard and Enterprise), and Embedded and Communication devices. PCI-Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI-Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the features supported by PCI-Express.

The system 100 includes an embodiment of a fabric composed of point-to-point lanes that interconnect a set of components. System 100 includes processor 105 and system memory 110 coupled to controller hub 115. Processor 105 includes any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, lane 106 includes a serial, differential interconnect architecture that is compliant with a different interconnect standard.

TABLE 1

| QPI/PCIe case | PCIe/QPI delay case | Meas. Window | Op./Power lane | PCIe Pk-Pk (mV) | Vmax/Vmin (V) |
|---|---|---|---|---|---|
| Wakeup | PCIe case2 (TX = RX = 6 ns Per lane across ports) | CIe:15.11 us-15.23 us | Op. lanes | 20.3 | 0.940 |
| | | | Power lanes | 20.4 | 0.940 |
| Wakeup | PcIe case3 (TX = RX = 6 ns per lane within ports, no port staggering) | PCIe:15.11 us-15.23 us | Op. lanes | 31.4 | 0.936 |
| | | | Power lanes | 32.3 | 0.937 |

As more serial lanes are added to components, the differential power peak increases. However, in embodiments, transmission and receiving lane staggering is used, along with Port to Port staggering to maintain a resultant differential peak to peak voltage within the limits set for the PCI-Express, for example, by the PCI-Express electrical spec group.

Previous solutions for determinism excluded I/O from the PSMI domain. PSMI was restricted only to CPU cores. However, in embodiments of the present techniques, a high speed serial I/O mode is used to create HVM functional vectors at-speed to increase the test coverage. Also, some original equipment manufacturers (OEM's) use lock step operation in their platforms. Accordingly, this can also be supported by determinism in high speed serial I/O mode. The OEM's platforms used these hooks to achieve lock step in their platform.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 is a root hub, root complex, or root controller in a Peripheral Component Interconnect Express (PCIe or PCIE) interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, i.e., a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial lane 119. Input/output modules 117 and 121, which may also be referred to as interfaces or ports 117 and 121, include or implement a layered protocol stack to provide communication between controller hub 115 and switch 120. In one embodiment, multiple devices are capable of being coupled to switch 120.

Switch or bridge 120 routes packets or messages from device 125 upstream, i.e., up a hierarchy towards a root complex, to controller hub 115 and downstream, i.e., down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a PCIe to PCI/PCI-X bridge to support legacy or other version PCI devices. Endpoint devices in PCIe are often classified as legacy, PCIe, or root complex integrated endpoints. Input/output modules 122 and 126, which may also be referred to as interfaces or ports 122 and 126, include or implement a layered protocol stack to provide communication between switch 120 and I/O Device 125.

Graphics accelerator 130 is also coupled to controller hub 115 through serial lane 132. In one embodiment, graphics accelerator 130 is coupled to an MCH, which is coupled to an ICH. Switch 120, and accordingly I/O device 125, is then coupled to the ICH. The I/O modules 131 and 118 also implement a layered protocol stack to communicate between graphics accelerator 130 and controller hub 115. Similar to the MCH discussion above, a graphics controller or the graphics accelerator 130 itself may be integrated in processor 105.

Figure 2:
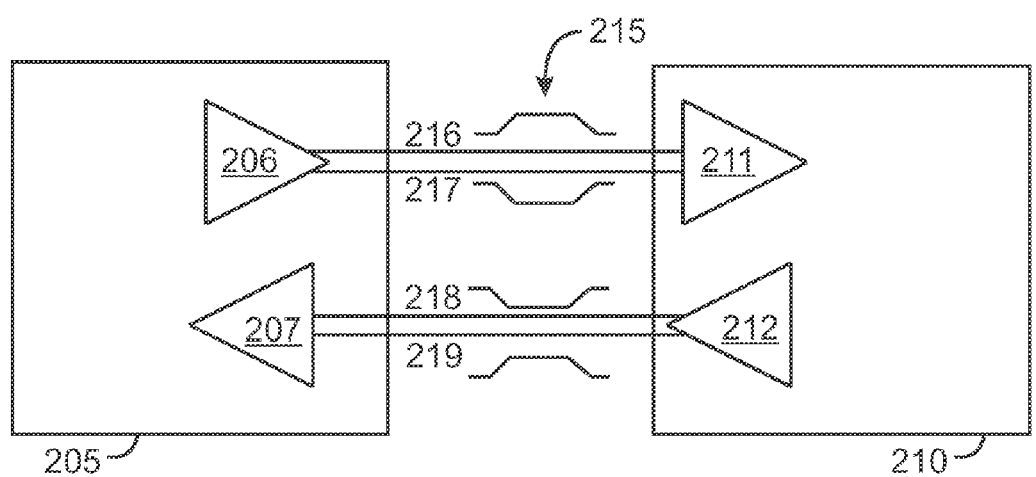
FIG. 2 is a block diagram of a PCIe serial point to point fabric, in accordance with embodiments.

Referring next to FIG. 2, which is a block diagram of a PCIe serial point to point fabric 200, in accordance with embodiments. Although an embodiment of a PCIe serial point-to-point lane is illustrated, a serial point-to-point lane is not so limited, as it may include any transmission path for transmitting serial data. In the embodiment shown, a PCIe lane includes two, low-voltage, differentially driven signal pairs: a transmit pair 206/311 and a receive pair 212/307. Accordingly, device 205 includes transmission logic 206 to transmit data to device 210 and receiving logic 207 to receive data from device 210. In other words, two transmitting paths, i.e., paths 216 and 217, and two receiving paths, i.e., paths 218 and 219, are included in a PCIe lane.

A transmission path refers to any path for transmitting data, such as a transmission line, a copper line, an optical line, a wireless communication channel, an infrared communication lane, or other communication path. A connection between two devices, such as device 205 and device 210, is referred to as a lane, such as lane 215. A lane may support one lane—each lane representing a set of differential signal pairs (one pair for transmission, one pair for reception). To scale bandwidth, a lane may aggregate multiple lanes denoted by xN, where N is any supported lane width, such as, 1, 2, 4, 8, 16, 32, 64, or wider.

A differential pair refers to two transmission paths, such as lines 216 and 217, to transmit differential signals. As an example, when line 216 toggles from a low voltage level to a high voltage level, i.e., a rising edge, line 217 drives from a high logic level to a low logic level, i.e., a falling edge. Differential signals potentially demonstrate better electrical characteristics, such as better signal integrity, i.e., cross-coupling, voltage overshoot or undershoot, ringing, etc. This allows for a better timing window, which enables faster transmission frequencies.

Figure 3:
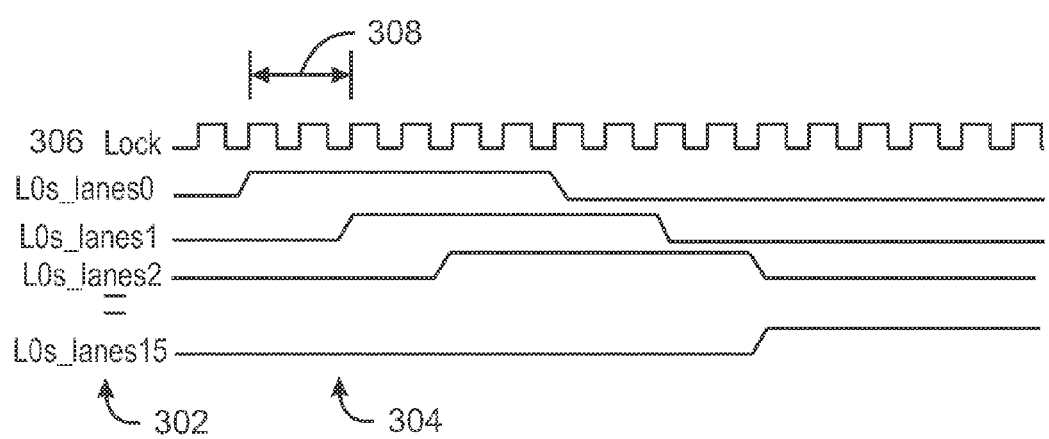
FIG. 3 illustrates an example lane staggering during Wake or Sleep timing according to a circuit interface, in accordance with embodiments.

FIG. 3 is a timing diagram 300 of an example lane staggering during Wake or Sleep timing to a circuit interface, in accordance with embodiments. The timing diagram 300 includes lanes 302, power management control signals (lane signals) 304, clock signal 306, and the programmable staggering interval 308. The timing diagram 300 shows how the LSA sends the lane signals 304 to the circuit interface, e.g., an Analog Front End, in a staggered fashion. The lane signals 304 are staggered per lane with the circuit interface. This can correspond to either the receiving (RX) side, i.e., the lanes 216, 217 of the receiving pair 206/311 of the end card, or the lanes 218, 219 of the transmitting pair 207/312, entering electrical idle state. When the end card enters electrical idle state on all lanes of its configured link, the LSA makes sure that the lanes are squelched in a staggered fashion. Also, multiple lanes may be bundled together for staggering. When two lanes are bundled together for staggering, for example, lane 216 and 217 turn ON simultaneously first. A token is next passed over to second bundle consisting of lanes 218 and 219, and so on. Up to four lanes may be bundled to turn ON or turn OFF simultaneously. This bundling is configurable through BIOS settings, where the default is typically set to individual lane staggering.

Figure 4:
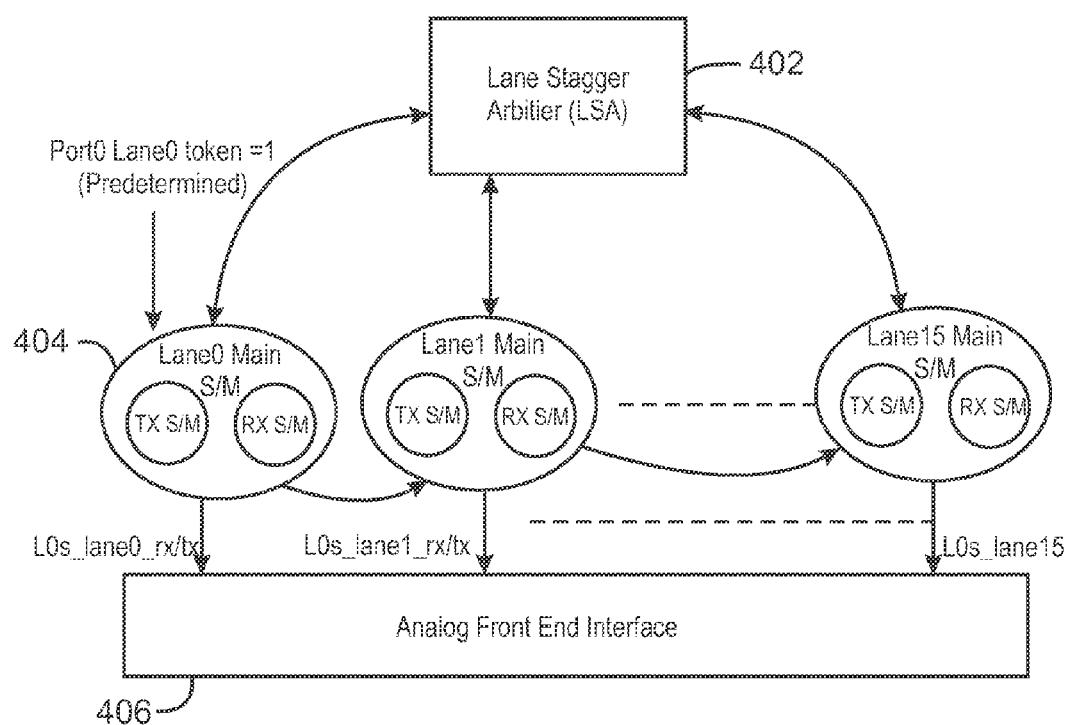
FIG. 4 is a block diagram of an example PCI-Express port, in accordance with embodiments.

FIG. 4 is a block diagram of an example PCI-Express port 400, in accordance with embodiments. The port 400 includes a lane stagger arbiter (LSA) 402, transmitter and receiver state machines 404, and an analog front end interface 406. The LSA 402 controls the transmitter and receiver state machines 404 for all lanes inside the PCI-Express port 400.

Figure 5:
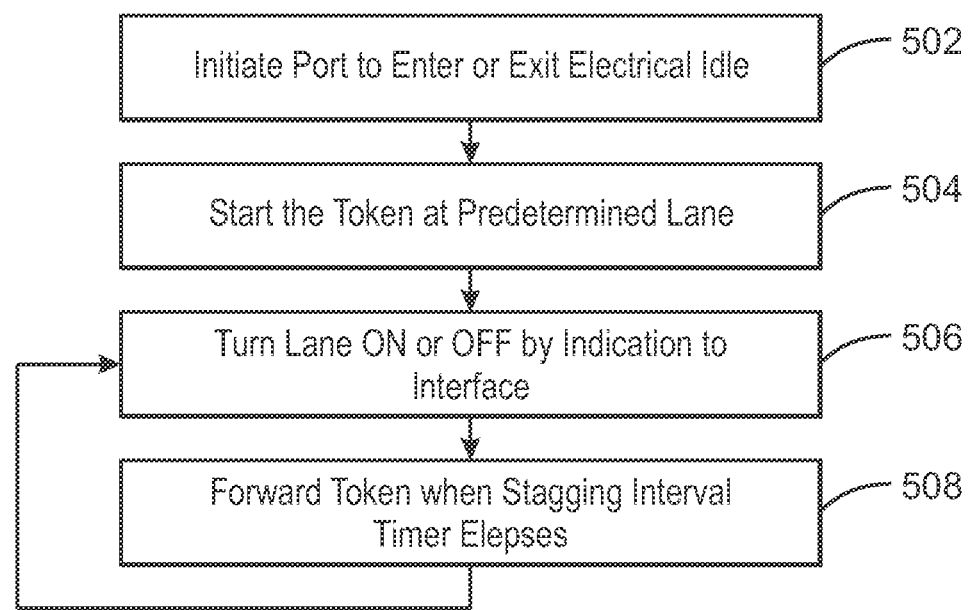
FIG. 5 is a process flow diagram of a method for lane staggering using a PCIe, in accordance with embodiments.

FIG. 5 is a process flow diagram of a method 500 for lane staggering using a PCIe, in accordance with embodiments. The method 500 provides a mechanism for low-power (as well as speed) transitions without impacting signal integrity and longevity of the PCI-Express components. As the number of lanes increases, and the process moves to advanced technology nodes, this will become an enabler for designing complex platforms. The method 500 begins at block 502, when the port 400 is initiated to enter or exit an electrical idle state. At block 504, the LSA 402 starts the token on predetermined lane 0 of port 0. At block 506, the lane 0 indicates to the analog front end interface 406 to turn ON or OFF the lane (through a power management signal, i.e., L0s or L1, to the interface 406). At block 508, the LSA 402 waits for the staggering interval timer (not shown) to elapse, and forwards the token to lane 1, which then asserts or deasserts the L0s/L1 signal to lane 1 of the interface 406, and so on. Additionally, embodiments of the present techniques provide the capability to enable or disable Port staggering with the help of a fuse bit (not shown), and a microcode write to the register structure before the start of the PCI-Express lane training on DMI port, and before the BIOS can be invoked.

Typically, the lanes of the PCI-Express port 400 lane up at a speed state of Gen1, and then change speed from Gen1 to Gen2 or Gen3. In PCI-Express, the lane initially starts from Electrical Idle, lanes up to Gen1 and then moves to Gen 1/3. Each speed change (Gen2/3) involves going through Electrical Idle to change the Data Rate (Gen2/3), and this involves the non-deterministic squelch circuitry. However, in embodiments of the techniques described herein, the PCI-Express is deterministic.

The non-determinism of previous PCI-Express results from: 1) having a receiver which is nondeterministic as it recovers the clock from serial high speed data, 2) lane training involving squelch circuitry, or lanes entering/exiting electrical Idle, 3) elastic buffer support of non-common clock configuration, and 4) a wide range of the supported lane-to-lane skew which also contributes to non-determinism. The PCI-Express Specification allows up to 20 ns of skew between adjacent lanes and 8 ns of the skew between the adjacent lanes as the tolerable limit which the receiver logical portion handles to keep the link operative.

Figure 6:
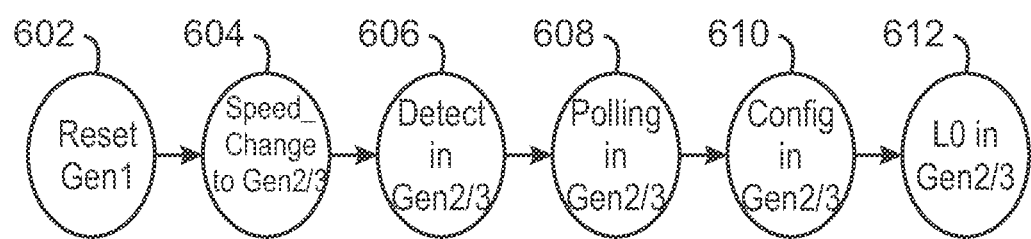
FIG. 6 is a speed state diagram of a PCI-Express port, in accordance with embodiments.

FIG. 6 is a speed state diagram of a PCI-Express port, in accordance with embodiments. State 602 represents an initial state where the lane starts up at the highest speed, either Gen2/3. In this way, there is no movement through speed changes, i.e., no lane up from Gen1. This prevents the PCI-Express lane from entering into Electrical Idle for speed change reasons. Additionally, this supports the at-speed HVM test vector generation for the SCAD board loopback testing using a proprietary flow. In these boards, generally the processor's high speed serial I/O transmit lane is connected to its own receiver lanes to perform the Electrical characterization. However, in examples of the present techniques, the Gen3 speed may be entered from the beginning itself, without first entering a Gen1 speed state and a speed change. This helps for the at-speed HVM test vector generation, reducing the time of testing and vector capturing.

Figure 7:
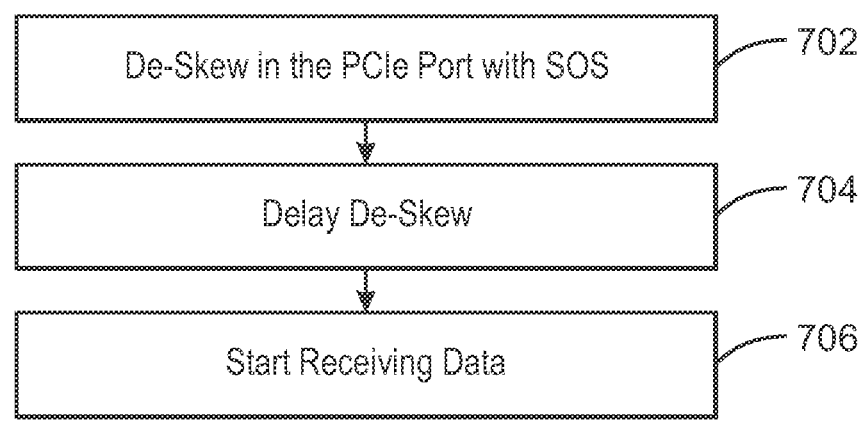
FIG. 7 is a process flow diagram of a method for latency fixing a PCI-Express port, in accordance with embodiments.

FIG. 7 is a process flow diagram of a method 700 for latency fixing a PCI-Express port, in accordance with embodiments. Latency fixing compensates for the causes of non-determinism described above. In other words, latency fixing fixes non-determinism. The last step in the PCI-Express lane training is to do lane to lane skew. The method 700 for latency fixing begins at block 702, where the de-skew in the PCIe port is done with SKP ordered set (SOS) in Gen1/2 or at the Start of Data Stream (SDS).

The time at which de-skew happens varies by up to 2 cycles from cold-boot to cold-boot due to the uncertainty of crossing asynchronous clock domains. Accordingly, at block 704, to eliminate the non-determinism, the LSA 402 delays the de-skew operation until there are at least a few more symbols beyond the SOS/SDS symbols in the de-skew buffer. These extra symbols provide a buffer to counter the 2 cycles of non-determinism. After the de-skew is done, at block 706, the PCI-Express lane layer starts receiving the data. Without latency fixing, the data delivered to the lane layer would be non-deterministic by 2 cycles from run to run.

FIGS. 8A-8D are example state diagrams 800A, 800B, 800C, 800D of the method 800 for latency fixing a non-deterministic PCIe port 500, in accordance with embodiments. The state diagrams 800A, 800B, 800C, 800D show an 8 bit determinism counter value 802. The determinism counter starts deterministically from the Platform reset de-assertion. The determinism counter value 802 at the time of de-skew is captured in a configuration register and stored in a read-write through a sticky register. System software reads this value, referred to herein as the calibrated value.

The LSA 402 adds a Latency fixing value to the calibrated value, writing the result to the same configuration register. In this way, the PCIe hardware de-skews when the determinism counter 802 is equal to the value specified in the configuration register.

Figure 8A:
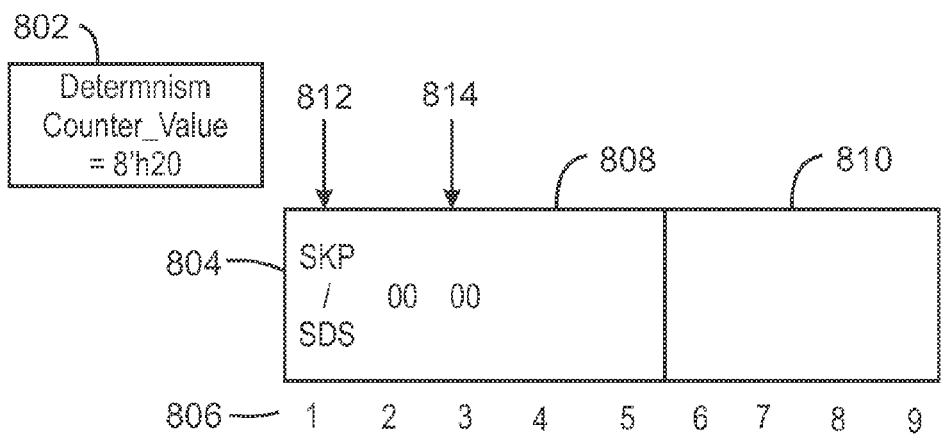
FIGS. 8A-8D are example state diagrams of the method for latency fixing a non-deterministic PCIe port, in accordance with embodiments.
Figure 8B:
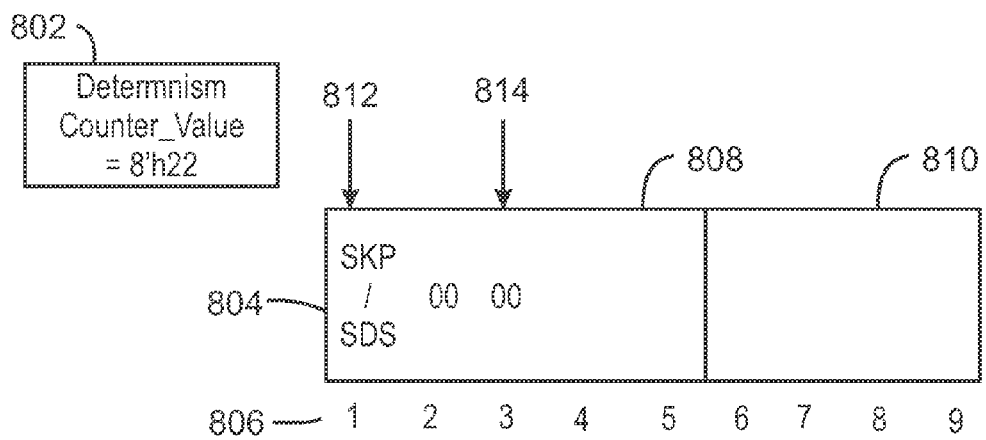
Figure 8C:
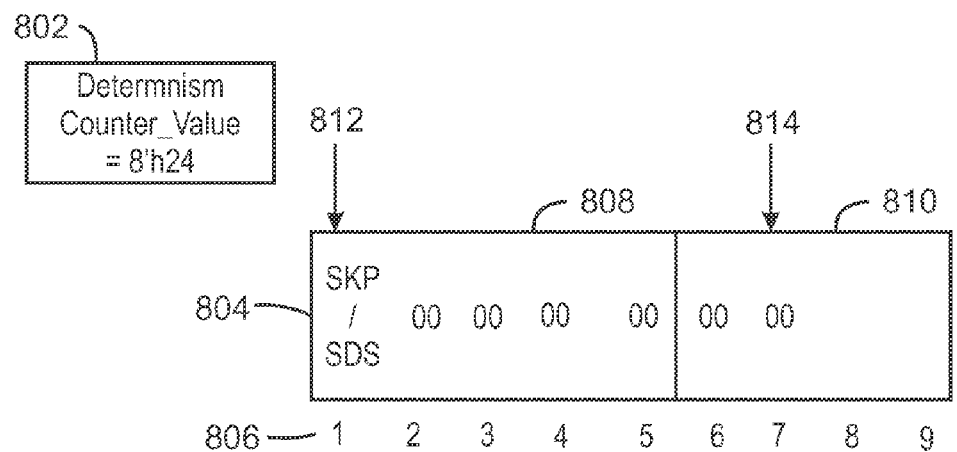
Figure 8D:
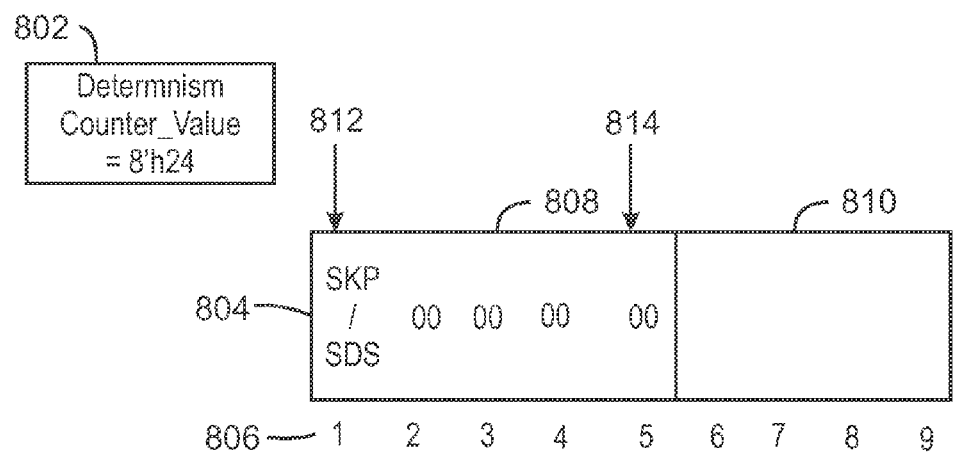

The state diagrams 800A, 800B, 800C, 800D also include a de-skew buffer 804 with nine entries 806. These nine entries 806 are sub-divided into a de-skew buffer 808 of five entries and a latency fixing buffer 810 of four entries. In FIGS. 8A-8D, the arrow 812 shows the position of a read pointer (rd_ptr) and arrow 814 shows the position of a writer pointer (wr_ptr). FIGS. 8A and 8B show that when de-skew is done between one cold-boot (RUN1) to a second cold-boot (RUN2), the determinism counter value 802 changes, which results in a non-determinism of up to 2 cycles. Accordingly, FIGS. 8A and 8B represent the position of the read and write pointers in 2 separate cold boots without latency fixing. The determinism counter 802 can be either 20h or 22h. Accordingly, the data delivered to the link layer from PHY in FIGS. 8A and 8B diverges. To be deterministic, the determinism counter (8 bit counter) stays the same from one run to another run. In FIGS. 8C and 8D, a latency fixing adjusts the difference in the deterministic counter value 802 of up to 2. As shown, in FIGS. 8C and 8D, the determinism counter value is the same: 24h, and hence the data delivered from the PHY to the Link layer is deterministic.

FIGS. 8C and 8D show that by doing de-skew at a deterministic time with a calibrated value (8'h22) plus 2 cycles of delay (gives value of 8'h24), data delivered to the lane layer is deterministic. Generation of the HVM at speed and providing increased test coverage is an enabler to ensure high volume manufacturing with low numbers of defects slipping in to the field. Additionally, this makes the post silicon debug involving PCI-Express integrated into CPU sockets possible due to repeatability. The determinism also enables building of complex fault-tolerant systems working in lockstep.

Figure 9:
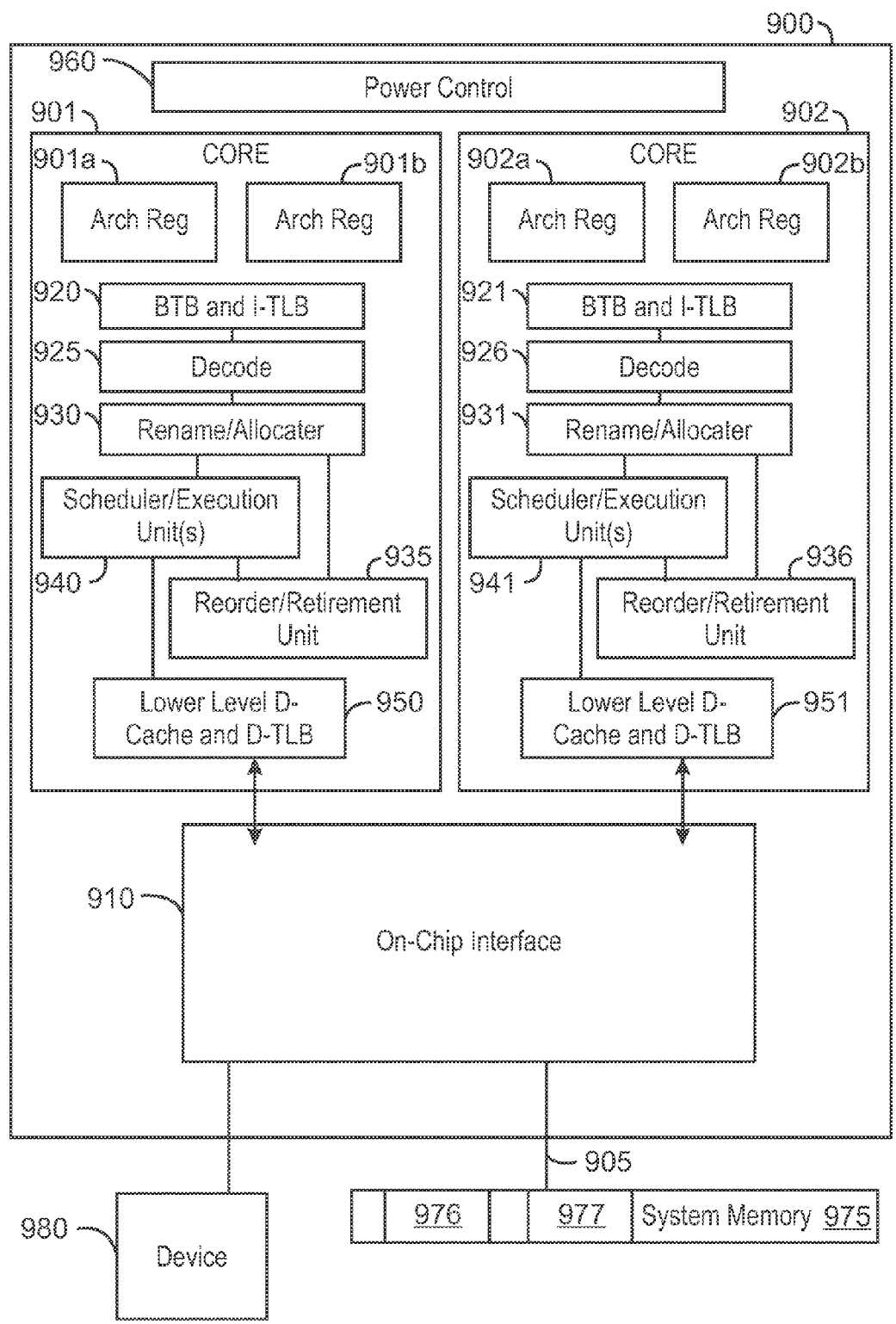
FIG. 9 is a block diagram of a computing system including a multicore processor, in accordance with embodiments.

Referring to FIG. 9, which is a block diagram of a computing system including a multicore processor, in accordance with embodiments. The processor 900 may include any processor, processing device, microprocessor, embedded processor, digital signal processor (DSP), network processor, handheld processor, application processor, co-processor, system on a chip (SOC), or other device to execute code. The processor 900, in one embodiment, includes at least two cores 901, 902. The cores 901, 902 may be symmetric or asymmetric. Further, the processor 900 may include any number of processing elements that may be symmetric or asymmetric.

As discussed herein, the term, "processing element," may refer to hardware or logic to support a software thread. Examples of hardware processing elements include: a thread unit, a thread slot, a thread, a process unit, a context, a context unit, a logical processor, a hardware thread, a core, or any other element capable of holding a state for a processor, such as an execution state or architectural state. In other words, a processing element, in one embodiment, refers to any hardware capable of being independently associated with code, such as a software thread, operating system, application, or other code. A physical processor, or processor socket, typically refers to an integrated circuit, which potentially includes any number of other processing elements, such as cores or hardware threads.

A core 901, 902 often refers to logic located on an integrated circuit capable of maintaining an independent architectural state, wherein each independently maintained architectural state is associated with at least some dedicated execution resources. In contrast, a hardware thread typically refers to any logic located on an integrated circuit capable of maintaining an independent architectural state, wherein the independently maintained architectural states share access to execution resources. When certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

The physical processor 900, includes two cores—core 901 and 902. Here, core 901 and 902 are symmetric cores, i.e., cores with the same configurations, functional units, and logic. In another embodiment, core 901 includes an out-of-order processor core, while core 902 includes an in-order processor core. However, cores 901 and 902 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e., asymmetric cores), some form of translation, such as binary translation, may be used to schedule or execute code on one or both cores. Yet to further the discussion, the functional units illustrated in core 901 are described in further detail below, as the units in core 902 operate in a similar manner in the depicted embodiment.

As depicted, core 901 includes two hardware threads, which may also be referred to as hardware thread slots. In one embodiment, software entities, such as an operating system, potentially view processor 900 as four separate processors, i.e., four logical processors or processing elements capable of executing four software threads concurrently. As alluded to above, a first thread is associated with architecture state registers (Arch Reg) 901a; a second thread is associated with architecture state registers 901b; a third thread may be associated with architecture state registers 902a; and, a fourth thread may be associated with architecture state registers 902b. Here, each of the architecture state registers (101a, 901b, 902a, and 902b) may be referred to as processing elements, thread units, and hardware threads or hardware thread slots, as described above. The architecture state registers 901a are replicated in architecture state registers 901b, so individual architecture states, or contexts, are capable of being stored for logical processor 901a and logical processor 901b. In core 901, other smaller resources, such as instruction pointers and renaming logic in renamer or allocator 930 may also be replicated for threads 901a and 901b. Some resources, such as re-order buffers in reorder or retirement unit 935, I-TLB 920, load or store buffers, and queues may be shared through partitioning. Other resources, such as general purpose internal registers, page-table base registers, low-level data-cache (D-Cache) and data-TLB (d-TLB) 950, scheduler or execution units 940, and portions of reorder or retirement unit 935 are potentially fully shared.

The processor 900 often includes other resources, which may be fully shared, shared through partitioning, or dedicated by, or to, processing elements. In FIG. 9, an embodiment of an exemplary processor with logical units and the resources of the processor 900 is illustrated. Note that the processor 900 may include, or omit, any of these functional units, as well as include any other known functional units, logic, or firmware not depicted. As illustrated, core 901 includes a simplified, representative out-of-order (OOO) processor core. But an in-order processor may be used in different embodiments. The OOO core includes a branch target buffer (BTB) 920 to predict branches to be executed, or taken, and an instruction-translation buffer (I-TLB) 920 to store address translation entries for instructions.

Core 901 further includes decode module 925 coupled to fetch unit 920 to decode fetched elements. Fetch logic, in one embodiment, includes individual sequencers associated with thread slots 901a, 901b, respectively. Usually, core 901 is associated with a first ISA, which defines or specifies instructions executable on processor 900. Often, machine code instructions that are part of the first ISA include a portion of the instruction (referred to as an opcode), which references or specifies an instruction or operation to be performed. Decode module 925 includes circuitry that recognizes these instructions from their opcodes, and passes the decoded instructions in the pipeline for processing as defined by the first ISA. For example, as discussed in more detail below, decode module 925, in one embodiment, includes logic to recognize specific instructions, such as transactional instruction. As a result of the recognition by decode module 925, the architecture or core 901 takes specific, predefined actions to perform tasks associated with the appropriate instruction. It is noted that any of the tasks, blocks, operations, and methods described herein may be performed in response to a single or multiple instructions; some of which may be new or old instructions. The decode module 926, in one embodiment, recognizes the same ISA (or a subset thereof). Alternatively, in a heterogeneous core environment, the decode module 926 recognizes a second ISA (either a subset of the first ISA or a distinct ISA).

In one example, rename and allocator 930 include an allocator to reserve resources, such as register files to store instruction processing results. However, threads 901a and 901b are potentially capable of out-of-order execution, where rename and allocator 930 also reserve other resources, such as reorder buffers to track instruction results. Rename and allocator 930 may also include a register renamer to rename program, or instruction, reference registers to other registers internal to the processor 900. Reorder and retirement unit 935 includes components, such as the reorder buffers mentioned above, load buffers, and store buffers, to support out-of-order execution and later in-order retirement of instructions executed out-of-order.

Scheduler and execution units 940, in one embodiment, include a scheduler unit to schedule instructions or operations on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 950 are coupled to scheduler and execution units 940. The data cache is to store recently used or operated-on elements, such as data operands, which are potentially held in memory coherency states. The D-TLB 950 is to store recent virtual, or linear, to physical address translations. As a specific example, the processor 900 may include a page table structure to break physical memory into a plurality of virtual pages.

Here, cores 901 and 902 share access to higher-level or further-out cache, such as a second level cache associated with on-chip interface 910. Note that higher-level or further-out refers to cache levels increasing or getting further way from the execution units. In one embodiment, higher-level cache is a last-level data cache—last cache in the memory hierarchy on processor 900—such as a second or third level data cache. However, higher level cache is not as limited, as it may be associated with or include an instruction cache. A trace cache—a type of instruction cache—instead may be coupled after decode module 925 to store recently decoded traces. Here, an instruction potentially refers to a macro-instruction (i.e., a general instruction recognized by the decode module 925), which may decode into a number of micro-instructions (micro-operations).

In the depicted configuration, processor 900 also includes on-chip interface 910. Historically, a memory controller, which is described in more detail below, has been included in a computing system external to processor 900. In this scenario, on-chip interface 910 is to communicate with devices external to processor 900, such as system memory 975, a chipset (often including a memory controller hub to connect to memory 975 and an I/O controller hub to connect peripheral devices), a memory controller hub, a northbridge, or other integrated circuit. Additionally in this scenario, bus 905 may include any known interconnect, such as multi-drop bus, a point-to-point interconnect, a serial interconnect, a parallel bus, a coherent (e.g., cache coherent) bus, a layered protocol architecture, a differential bus, and a GTL bus.

Memory 975 may be dedicated to processor 900 or shared with other devices in a system. Common examples of types of memory 975 include DRAM, SRAM, non-volatile memory (NV memory), and other known storage devices. Note that device 980 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 900. For example in one embodiment, a memory controller hub is on the same package and/or die with processor 900. Here, a portion of the core (an on-core portion) 910 includes one or more controllers for interfacing with other devices such as memory 975 or a graphics device 980. The configuration including an interconnect and controllers for interfacing with such devices is often referred to as an on-core (or un-core configuration). As an example, on-chip interface 910 includes a ring interconnect for on-chip communication and a high-speed serial point-to-point lane 905 for off-chip communication. Yet, in the SOC environment, even more devices, such as the network interface, co-processors, memory 975, graphics processor 980, and any other known computer devices and interface may be integrated on a single die or integrated circuit to provide small form factor with high functionality and low power consumption.

In one embodiment, processor 900 is capable of executing a compiler, optimization, and translator code 977 to compile, translate, and optimize application code 976 to support the apparatus and methods described herein, or related interface. A compiler often includes a program or set of programs to translate source text or code into target text or code. Usually, compilation of program, or application, code with a compiler is done in multiple phases, and multiple passes. These multiple phases and passes transform hi-level programming language code into low-level machine or assembly language code. Yet, single pass compilers may still be used for simple compilation. A compiler may use any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e., generally where syntactic processing, semantic processing, and some transformation or optimization may take place, and (2) a back-end, i.e., generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc., in one or more phases of compilation, such as insertion of calls and operations in a front-end phase of compilation, and transformation of the calls and operations into lower-level code during a transformation phase. Note that during dynamic compilation, compiler code or dynamic optimization code may insert such operations and calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and translate code. Therefore, reference to execution of code, application code, program code, or other software environment may refer to: (1) execution of one or more compiler programs, optimization code optimizer, or translator either dynamically or statically, to compile program code, to maintain software structures, to perform other operations, to optimize code, or to translate code; (2) execution of main program code including operations and calls, such as application code that has been optimized and compiled; (3) execution of other program code, such as libraries, associated with the main program code to maintain software structures, to perform other software related operations, or to optimize code; or (4) a combination.

Figure 10:
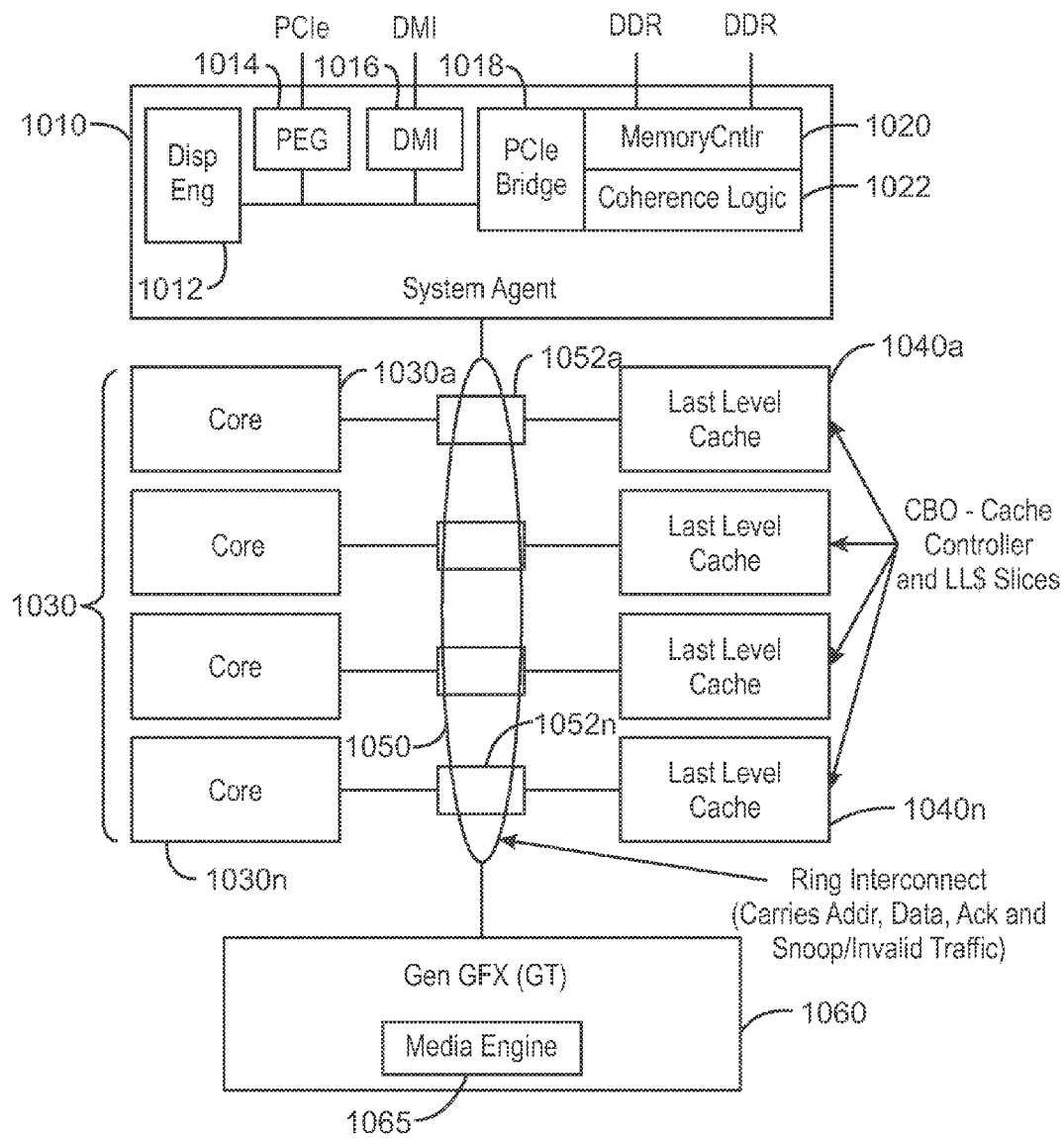
FIG. 10 is a block diagram of an embodiment of a multicore processor, in accordance with embodiments.

Referring now to FIG. 10, which is a block diagram of an embodiment of a multicore processor, in accordance with embodiments. The processor 1000 includes multiple domains. Specifically, a core domain 1030 includes a plurality of cores 1030A-1030N, a graphics domain 1060 includes one or more graphics engines having a media engine 1065, and a system agent domain 1010.

In various embodiments, system agent domain 1010 handles power control events and power management, such that individual units of domains 1030 and 1060 (e.g. cores and/or graphics engines) are independently controllable to dynamically operate at an appropriate power mode/level (e.g. active, turbo, sleep, hibernate, deep sleep, or other Advanced Configuration Power Interface like state) in light of the activity (or inactivity) occurring in the given unit. Each of domains 1030 and 1060 may operate at different voltage and/or power, and Further the individual units within the domains each potentially operate at an independent frequency and voltage. Note that while only shown with three domains, understand the scope of the present techniques is not limited in this regard and additional domains may be present in other embodiments.

As shown, each core 1030 further includes low level caches in addition to various execution units and additional processing elements. Here, the various cores are coupled to each other and to a shared cache memory that is formed of a plurality of units or slices of a last level cache (LLC) 1040A-1040N; these LLCs often include storage and cache controller functionality and are shared amongst the cores, as well as potentially among the graphics engine too.

As seen, a ring interconnect 1050 couples the cores together, and provides interconnection between the core domain 1030, graphics domain 1060 and system agent circuitry 1010, via a plurality of ring stops 1052A-1052N, each at a coupling between a core and LLC slice. The interconnect 1050 is used to carry various information, including address information, data information, acknowledgement information, and snoop/invalid information. Although a ring interconnect is illustrated, any known on-die interconnect or fabric may be used. As an illustrative example, some of the fabrics discussed above (e.g. another on-die interconnect, Intel On-chip System Fabric (IOSF), an Advanced Microcontroller Bus Architecture (AMBA) interconnect, a multi-dimensional mesh fabric, or other known interconnect architecture) may be used in a similar fashion.

As further depicted, system agent domain 1010 includes display engine 1012 which is to provide control of and an interface to an associated display. System agent domain 1010 may include other units, such as: an integrated memory controller 1020 that provides for an interface to a system memory (e.g., a DRAM implemented with multiple DIMMs; coherence logic 1022 to perform memory coherence operations. Multiple interfaces may be present to enable interconnection between the processor and other circuitry. For example, in one embodiment at least one direct media interface (DMI) 1016 interface is provided as well as one or more PCIe™ interfaces 1014. The display engine and these interfaces typically couple to memory via a PCIe™ bridge 1018. Still further, to provide for communications between other agents, such as additional processors or other circuitry, one or more other interfaces (e.g. an Intel® Quick Path Interconnect (QPI) fabric) may be provided.

Turning next to FIG. 11, which is an embodiment of a system on-chip (SOC) design, in accordance with embodiments. As a specific illustrative example, SOC 1100 is included in user equipment (UE). In one embodiment, UE refers to any device to be used by an end-user to communicate, such as a handheld phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1100 includes 2 cores-1106 and 1107. Similar to the discussion above, cores 1106 and 1107 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1111 includes an on-chip interconnect, such as an IOSF, AMBA, or other interconnect discussed above, which potentially implements one or more aspects of the described techniques.

Interface 1111 provides communication channels to the other components, such as a Subscriber Identity Module (SIM) 1130 to interface with a SIM card, a boot ROM 1135 to hold boot code for execution by cores 1106 and 1107 to initialize and boot SOC 1100, a SDRAM controller 1140 to interface with external memory (e.g. DRAM 1160), a flash controller 1145 to interface with non-volatile memory (e.g. Flash 1165), a peripheral control Q1650 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the techniques described herein.

In addition, the system illustrates peripherals for communication, such as a Bluetooth module 1170, 3G modem 1175, GPS 1185, and WiFi 1185. Note as stated above, a UE includes a radio for communication. As a result, these peripheral communication modules are not all required. However, in a UE some form a radio for external communication is to be included.

EXAMPLE 1

A method of debugging a computing system using a non-core system register, or register means, is described herein. The register means may include a register of accessible by a system agent of the computing device, wherein the system agent is a non-core component of the computing device. Debug data may be generated at agents in the computing system including agents of firmware devices and agents of system software such as drivers of the computing system. The agents have access to the register means, and the register may accessible via a observability fabric means, such as a system interconnect fabric, to enable debug data to be stored in a memory unit and analyzed by debug software and/or hardware. The observability fabric means may include an on-chip analyzer configured to compress and time stamp the debug data.

EXAMPLE 2

An apparatus is described herein. The apparatus may be configured to receive debug data at a non-core register, or register means. The register may be configured to record the debug data and a memory unit, or memory means, may be configured to receive the debug data via an interconnect fabric, such as an observability fabric, or observability fabric means. The memory unit may store the debug data and may be accessible by debug software and/or hardware to determine the source of the debug data. In embodiments, the interconnect fabric may include analyzer logic, such as an on-chip analyzer, to compress and timestamp the data to be received at the memory unit. The agents may include driver agents of an operating system and/or firmware agents of microcontrollers communicatively coupled to the system. In embodiments, the agents, such as the firmware agents, may have access to the register via a computing system interconnect means, such as the observability fabric discussed above.

EXAMPLE 3

A computing device is described herein. The computing device may include a driver agent, a firmware agent, and a register means. The driver agent may be driver logic that is accessible by driver code to be executed on a processing element. The driver agent is associated with an operating system of the computing device to generate debug data. The firmware agent may be controller logic to provide second debug data for one or more controllers. The register means, may be a register, or a storage element, disposed in a non-core portion of the computing device, wherein the firmware agents and the driver agents may provide debug data to the register. The register may be configured to record the debug data and a memory unit, or memory means, may be configured to receive the debug data via an interconnect fabric, such as an observability fabric, or observability fabric means. The memory unit may store the debug data and may be accessible by debug software and/or hardware to determine the source of the debug data. In embodiments, the interconnect fabric may include analyzer logic, such as an on-chip analyzer, to compress and timestamp the data to be received at the memory unit. The agents may include driver agents of an operating system and/or firmware agents of microcontrollers communicatively coupled to the system. In embodiments, the agents, such as the firmware agents, may have access to the register via an computing system interconnect means, such as the observability fabric discussed above.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Further, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

While the present techniques has been described with respect to a limited number of embodiments, those skilled in the art will appreciate numerous modifications and variations therefrom. It is intended that the appended claims cover all such modifications and variations as fall within the true spirit and scope of this present techniques.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Further, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying embodiments of the present techniques.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Further, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Further, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e., reset, while an updated value potentially includes a low logical value, i.e., set. Note that any combination of values may be used to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the techniques may be stored within a memory in the system, such as DRAM, cache, flash memory, or other storage. Further, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present techniques. Thus, the appearances of the phrases "in one embodiment" or "in an embodiment" in various places throughout this specification are not necessarily all referring to the same embodiment. Further, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the techniques as set forth in the appended claims. The specification and drawings are, accordingly, to be regarded in an illustrative sense rather than a restrictive sense. Further, the foregoing use of embodiment and other exemplarily language does not necessarily refer to the same embodiment or the same example, but may refer to different and distinct embodiments, as well as potentially the same embodiment.

What is claimed is:

1. A method of staggering lanes in a high speed serial input/output (I/O) port, comprising:
   initiating the high speed serial I/O port to enter an electrical idle state;
   and staggering a plurality lanes of the high speed serial I/O port such that multiple lanes do not switch power states simultaneously, wherein staggering comprises:
   a) forwarding a token to a predetermined lane of the high speed serial I/O port;
   b) turning a lane associated with the forwarded token ON or OFF by indication to an analog circuit interface;
   c) forwarding the token to a neighboring lane when a staggering interval timer elapses; and
   d) repeating steps b and c until the high speed serial I/O port enters the electrical idle state.

2. The method of claim 1, comprising initiating the high speed serial I/O port to exit the electrical idle state.

3. The method of claim 1, comprising grouping all the lanes of the high speed serial I/O port into a plurality of groups, each group comprising a specified number of lanes, and wherein all lanes of each group are staggered such that multiple lanes do not switch power states simultaneously.

4. The method of claim 1, the lanes comprising a receiver link and a transmitter link.

5. The method of claim 1, the high speed serial I/O port comprising a universal serial bus (USB) port.

6. The method of claim 1, the high speed serial I/O port comprising a peripheral component interconnect express (PCI-Express) port.

7. The method of claim 1, the high speed serial I/O port comprising a serial advanced technology attachment (SATA) port.

8. The method of claim 1, comprising starting a processor directly at Gen2 speeds to support high volume manufacturing (HVM) debug at Gen2 speeds.

9. The method of claim 8, comprising starting the processor directly at Gen3 speeds to support HVM debug at Gen3 speeds.

10. A system, comprising:
a storage element to be updated to hold a representation of an active power state;
control logic coupled to the storage element to initiate entry of a port into the active power state from an electrical idle state in response to the storage element being updated to hold the representation of the active power state;
delay logic coupled to the control logic to transition one or more of a plurality of lanes to be associated with the port into the active power state at different times in response to the control logic initiating entry of the port into the active power state;
speed logic coupled to the delay logic to start the processor directly at Gen3 speeds to support HVM debug at Gen3 speeds; and
stagger logic coupled to the delay logic to:
a) forward a token to a predetermined lane of the port:
b) turn a lane with the forwarded token ON or OFF by indication to an analog circuit interface:
c) forward the token to a neighboring lane when a staggering interval timer elapses; and
d) repeat steps b and c until the active power state is updated.

11. The system of claim 10, comprising:
delay logic to delay deskewing data passing through the port until a buffer contains more symbols than a predetermined number of delay cycles;
generation logic to generate deterministic data by deskewing in the non-deterministic port with SKP ordered set (SOS); and
receive logic to receive the deterministic data.

12. The system of claim 10, comprising a storage unit to group all the lanes of the port into a plurality of groups, each group comprising an equal a specified number of lanes, and wherein all lanes of each group are staggered such that multiple lanes do not switch power states simultaneously.

13. The system of claim 10, all the lanes comprising a receiver link and a transmitter link.

14. A non-transitory computer readable medium including code, when executed, to cause a processing device to:
initiate a high speed serial input/output (I/O) port to enter an electrical idle state; stagger a plurality lanes of the high speed serial I/O port such that multiple lanes do not switch power states simultaneously, by:
a) forwarding a token to a predetermined lane of the high speed serial I/O port;
b) turning a lane associated with the forwarded token ON or OFF by indication to an analog circuit interface;
c) forwarding the token to a neighboring lane when a staggering interval timer elapses; and
d) repeating steps b and c until the high speed serial I/O port enters the electrical idle state.

15. The medium of claim 14, comprising code, when executed, to cause the processing device to initiate the high speed serial I/O port to exit the electrical idle state.

16. The medium of claim 15, the lanes comprising a receiver link and a transmitter link.

17. The medium of claim 15, the high speed serial I/O port comprising a peripheral component interconnect express (PCI-Express) port.

* * * * *